(12) United States Patent
Bot

(10) Patent No.: US 12,126,666 B2
(45) Date of Patent: Oct. 22, 2024

(54) PROVIDING TRANSPARENT MULTICAST CONTENT VIA MOBILE TELECOMMUNICATION NETWORK

(71) Applicant: ONE2MANY B.V., Deventer (NL)

(72) Inventor: Menno Jonathan Bot, Deventer (NL)

(73) Assignee: ONE2MANY B.V., Deventer (NL)

( * ) Notice: Subject to any disclaimer, the term of this patent is extended or adjusted under 35 U.S.C. 154(b) by 34 days.

(21) Appl. No.: 17/913,395

(22) PCT Filed: Mar. 23, 2021

(86) PCT No.: PCT/EP2021/057403
§ 371 (c)(1),
(2) Date: Sep. 21, 2022

(87) PCT Pub. No.: WO2021/197920
PCT Pub. Date: Oct. 7, 2021

(65) Prior Publication Data
US 2023/0412661 A1 Dec. 21, 2023

(30) Foreign Application Priority Data
Mar. 31, 2020 (NL) ..................... 2025243

(51) Int. Cl.
*H04L 65/611* (2022.01)
*H04L 12/18* (2006.01)
(Continued)

(52) U.S. Cl.
CPC ............ *H04L 65/611* (2022.05); *H04L 45/22* (2013.01); *H04L 65/1069* (2013.01); *H04L 12/189* (2013.01); *H04W 4/06* (2013.01)

(58) Field of Classification Search
CPC ... H04L 65/611; H04L 45/22; H04L 65/1069; H04L 12/189; H04L 65/65; H04L 65/764; H04W 4/06
See application file for complete search history.

(56) References Cited

U.S. PATENT DOCUMENTS

| | | | | |
|---|---|---|---|---|
| 2012/0263089 A1* | 10/2012 | Gupta | ................... | H04W 72/30 370/312 |
| 2013/0294321 A1* | 11/2013 | Wang | ................... | H04W 28/16 370/312 |
| 2022/0322291 A1* | 10/2022 | Wang | ................... | H04W 76/10 |

FOREIGN PATENT DOCUMENTS

WO 2008044971 A1 4/2008

OTHER PUBLICATIONS

International Search Report and Written Opinion dated Jul. 16, 2021, for Application No. PCT/EP2021/057403 (14 pages).
(Continued)

*Primary Examiner* — Abdulkader M Alriyashi
(74) *Attorney, Agent, or Firm* — KDW Firm PLLC

(57) ABSTRACT

A method for providing multimedia content as multicast packets in a mobile communications network. A client device and a multimedia server capable of performing said method. The multimedia server determines a current demand value for the multimedia content, the value being the number of clients which are being provided with said multimedia content and the number of clients from which the request has been received but which are not yet being provided with said multimedia content. If the determined current demand value of said multimedia content is below said pre-defined threshold, the multimedia server provides said multitude of clients with said multimedia content using a tunnel which is set up to each one of the clients using a tunnel protocol. The multimedia content is sent as multicast packets which are encapsulated by using said tunnel protocol.

17 Claims, 2 Drawing Sheets

(51) Int. Cl.
*H04L 45/00* (2022.01)
*H04L 65/1069* (2022.01)
*H04W 4/06* (2009.01)

(56) References Cited

OTHER PUBLICATIONS

Qualcomm Incorporated, "More on MooD Header", 3GPP TSG-SA WG4 Meeting #80 S4-141048, San Francisco, USA Aug. 4-8, 2014 [revision of S4-140952 ].
"Universal Mobile Telecommunications System (UMTS)", LTE; Multimedia Broadcast/Multicast Service (MBMS); Protocols and codecs (3GPP TS 26.346 version 14.8.0 Release 14); Jan. 16, 2019.
International Preliminary Report on Patentability dated Sep. 29, 2022, for Application No. PCT/EP2021/057403 (seven (7) pages).

* cited by examiner

PROVIDING TRANSPARENT MULTICAST CONTENT VIA MOBILE TELECOMMUNICATION NETWORK

This application is a national stage filing under 35 U.S.C. 371 of pending International Application No. PCT/EP2021/057403, filed Mar. 23, 2021, which claims priority to Netherlands Patent Application No. 2025243, filed Mar. 31, 2020, the entirety of which applications are incorporated by reference herein.

The present invention relates to a method for providing multimedia content as multicast packets in a mobile communications network. The present invention further relates to a client device and a multimedia server capable of performing said method.

In a telecommunications network, a multitude of clients can express demand for a multimedia content by creating a request for said multimedia content from the network by each one of the multitude of clients, and sending said corresponding request to a multimedia server connected to the network and capable of providing the multimedia content.

In 3GPP release 9, evolved multimedia broadcast multicast service (eMBMS) was specified for efficient delivery of dynamic adaptive streaming over HTTP (DASH), file download and real-time transport protocol (RTP) content for LTE. Later, in 3GPP release 13, transparent multicast was added as a feature for eMBMS. In 3GPP release 14, MBMS operation on demand (MooD) was specified, allowing the handling of MBMS sessions to be automated in dependence of user demand. When there is insufficient demand for a particular multimedia content, said content can be delivered as unicast, that is, one delivery per client. When the demand for a particular content exceeds a threshold, the eMBMS session can be started.

3GPP specifications specify how clients that consume content over unicast notify the MooD server of their capabilities, and specify how said clients can be notified of a delivery using MBMS for the same content. In addition, 3GPP specifications specify how clients consuming content using MBMS can still keep the MooD server informed of their consumption of said content using consumption reports.

However, MooD has only been specified for DASH-formatted content, and not for RTP content or for transparent multicast. Transparent multicast can, for example, be used to deliver linear content, such as a TV service, which can be delivered using MBMS. In the context of the present invention, being transparent implies that the client which receives the multimedia content receives said multimedia content in the same format regardless of the delivery method. In other words, the multicast is not modified, but rather it is sent transparently to the user, e.g. using MBMS.

Using MBMS, transparent multicast content can be delivered as a broadcast using MBMS to each of a multitude of users, but also to a single user. However, 3GPP does not support multicast and related protocols, such as internet group management protocol (IGMP), in mobile telecommunications networks.

It is an object of the present invention to provide a method in which transparent multicast in mobile telecommunications networks is achieved in an efficient manner.

This object is achieved with the method according to claim 1 that is characterized in that the multimedia server determines a current demand value for the multimedia content, said value being the number of clients which are being provided with said multimedia content and the number of clients from which the request has been received but which are not yet being provided with said multimedia content. If the determined current demand value of said multimedia content is equal to or above a pre-defined threshold, the multimedia server provides said multitude of clients with said multimedia content as multicast packets using a multimedia broadcast multicast service. If the determined current demand value of said multimedia content is below said pre-defined threshold, the multimedia server provides said multitude of clients with said multimedia content using a tunnel which is set up to each one of said clients using a tunnel protocol, wherein said multimedia content is sent as multicast packets which are encapsulated by using said tunnel protocol.

An advantage of this approach is that the multimedia server can deliver the multimedia content to clients as multicast packets using either the multimedia broadcast multicast service or the tunnel. The multimedia server can automatically switch between said two described delivery methods in dependence of the demand value for said multimedia content, thereby optimizing bandwidth efficiency. Another advantage is that the content for both delivery methods is identical, meaning that the content does not require any reformatting or recoding. Furthermore, a client device performing said method does not require any alteration of the content of complex logic. Finally, another benefit of using transparent multicast is that it can carry any protocol that is suitable for broadcast.

The request for multimedia content from each one of a multitude of clients may comprise a request to initiate the multitude of tunnels over the mobile telecommunications network to said multitude of clients. For example, when one of a multitude of clients express demand for the multimedia content, said client may include a request to initiate a tunnel between the multimedia server and the client along with a request for said multimedia content.

The tunnel initiation may be performed before requesting multimedia content, simultaneously with requesting multimedia content, or after requesting content and after the multimedia server has acknowledged that a tunnel delivery will be used. Alternatively, the tunnel may be initiated by the server, rather than the client, for example after determining that a tunnel delivery will be used.

The tunnel protocol may be handled by tunnel endpoint servers in said network. Preferably, said tunnel endpoint servers are part of the radio access network (RAN) devices in said mobile telecommunications network. For example, the technology and standards used may be in accordance with ETSI Multi-access Edge Computing (MEC) that allow for having a tunnel endpoint server as part of the RAN.

When the at least one client requesting the multimedia content results in the demand value for said multimedia content to increase from below the pre-defined threshold to above said pre-defined threshold, the multimedia server may request a broadcast multicast service center in the network to provide said multimedia content over said multimedia broadcast multicast service. The multimedia server may send, after a pre-defined period of time, a switch message to each one of said multitude of clients being provided with said multimedia content using the tunnels corresponding to said clients. The multitude of clients may, in turn after receiving said switch message, a new request for multimedia content from said network to said multimedia server. After receiving said new request, the multimedia server may respond to each one of said multitude of clients that said multimedia content is available using said multimedia broadcast multicast service. The broadcast multicast service center may then provide said clients with said multimedia content using said multimedia broadcast multicast service, and the multimedia server may halt the multimedia content delivery over the corresponding tunnels. The new request for multimedia content may further comprise a flag which indicates that the request is sent in response to a switch request. The flag prevents double counting of users consuming the multimedia content by the multimedia server.

Responding, by said multimedia server, to each one of said multitude of clients that said multimedia content is available over said multimedia broadcast multicast service may further comprise sending a multicast internet protocol (IP) address, a first port number and a temporary mobile group identity (TMGI). Furthermore, the clients may use the TMGI to start said multimedia broadcast multicast service session.

Sending, by the multimedia server, the switch message to each one of said multitude of clients being provided with said multimedia content may further comprise sending one or more IP/UDP packets having as port a second port number different from the first port number. Since it is not guaranteed that said packets will arrive at all of said multitude of clients, the switch message is preferably sent a multitude of times. The switch message may also be multicast content, and may have as its destination a multicast IP address.

Providing the multimedia content as encapsulated multicast packets to each one of said multitude of clients using the corresponding tunnels may be delayed by a pre-defined delay time. Said pre-defined time may correspond to a delay that on average is caused by syncing schedules of the multimedia broadcast multicast service that is used. For example, the pre-defined delay time may be between 80 ms and 160 ms. In doing so, when clients consuming said multimedia content are switched from tunnel delivery to multimedia broadcast multicast service delivery, a discontinuity in the delivered multimedia content during switching is prevented or limited.

The request for multimedia content from the network created by the at least one client may comprise an internet group management protocol (IGMP) join request, which may be created using a multicast address and IGMP. In order to be able to transmit said request to the multimedia server, said IGMP join request may be translated into a HTTP join request. Said HTTP join request may comprise at least one of a multicast address, a join request, a location and a client IP address of the corresponding initiated tunnel.

Providing the multimedia content as encapsulated multicast packets to the each one of said multitude of clients using the corresponding tunnel may comprise requesting, by the multimedia server, the tunnel endpoint server to join the multimedia content and to deliver said multimedia content as encapsulated multicast packets over the corresponding initiated tunnel. For example, the multimedia server may request the tunnel endpoint server using SMCroute.

When at least one client receiving the multimedia content stops watching the multimedia content, said at least one client may create a request to stop receiving said multimedia content. Said request may be sent, by said at least one client, to the multimedia server which, in turn, may send an acknowledge message to said at least one client, and may stop providing the multimedia content to said at least one client.

The multimedia server may determine the current demand value for the multimedia content comprising the number of clients which are being provided with said multimedia content and the number of clients from which a join request has been received but which are not yet being provided with said multimedia content, and excluding the number of clients from which a leave request has been received.

When at least one client requesting to stop receiving said multimedia content results in the demand value for said multimedia content to decrease from equal to or above the pre-defined threshold to below said pre-defined threshold, the multimedia server may send a switch message to each one of said multitude of clients being provided with said multimedia content using the multimedia broadcast multicast service. In turn, each one of said multitude of clients may send, after receiving said switch message, a new request for multimedia content from said network to said multimedia server, which may comprise a join request and a request to initiate a tunnel. The multimedia server may set up a tunnel to each one of said clients using a tunnel protocol, and may respond to each one of said multitude of clients that the delivery of said multimedia content will be performed using a tunnel corresponding to each one of said multitude of clients. Furthermore, the multimedia server may provide said multitude of clients with said multimedia content using corresponding tunnels and, after each of said multitude of clients have switched to tunnel delivery, may stop providing said multimedia content using the multimedia broadcast multicast service.

Creating, by at least one client, a request to stop receiving multimedia content from the network may comprise generating an IGMP leave request using a multicast address and IGMP. Furthermore, in order to be able to transmit said request to the multimedia server, said IGMP leave request may be translated into a HTTP leave request. Said HTTP leave request may comprise at least one of a multicast address, a current delivery method, a leave request, and a client IP address.

The abovementioned tunnel protocol may comprise a point-to-point tunnel protocol (PPTP) or a generic routing encapsulation (GRE) protocol. Furthermore, the multimedia server may comprise an MBMS operation on demand (MooD) server.

Next, the present invention will be described with reference to the appended drawings, wherein.

Hereinafter, reference will be made to the appended drawings. It should be noted that identical reference signs may be used to refer to identical or similar components.

Figure 1:
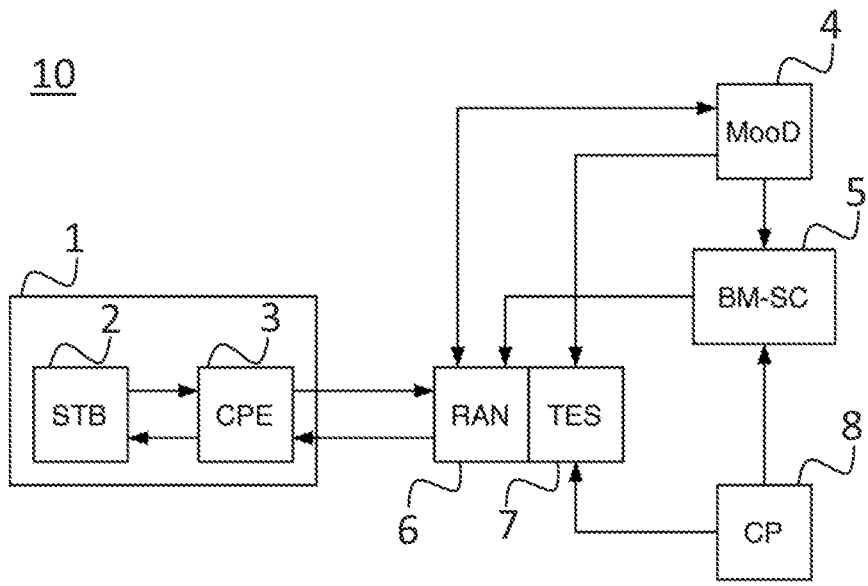
FIG. 1 is a schematic diagram illustrating the method according to an exemplary embodiment of the present invention.
Figure 2:
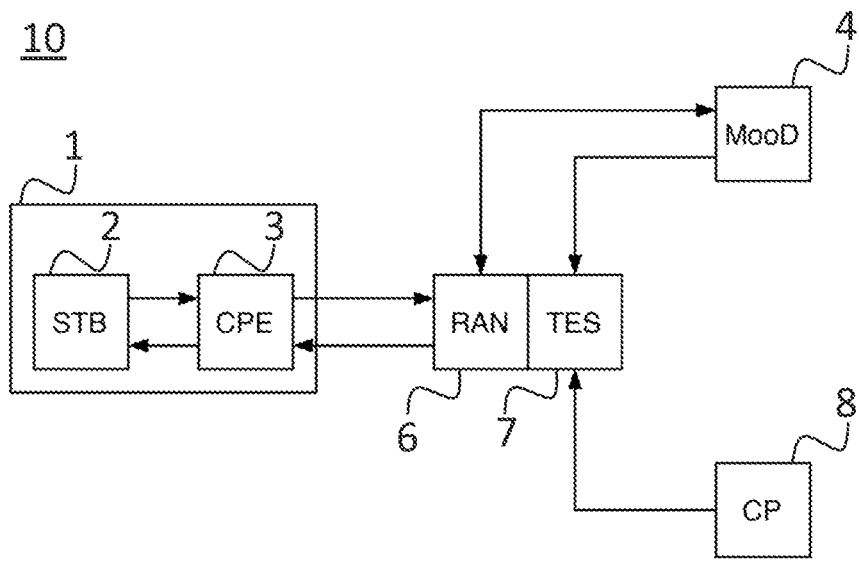
FIG. 2 is a partial schematic diagram of the method according to the embodiment of FIG. 1, relating to the delivery of multimedia content using a tunnel.
Figure 3:
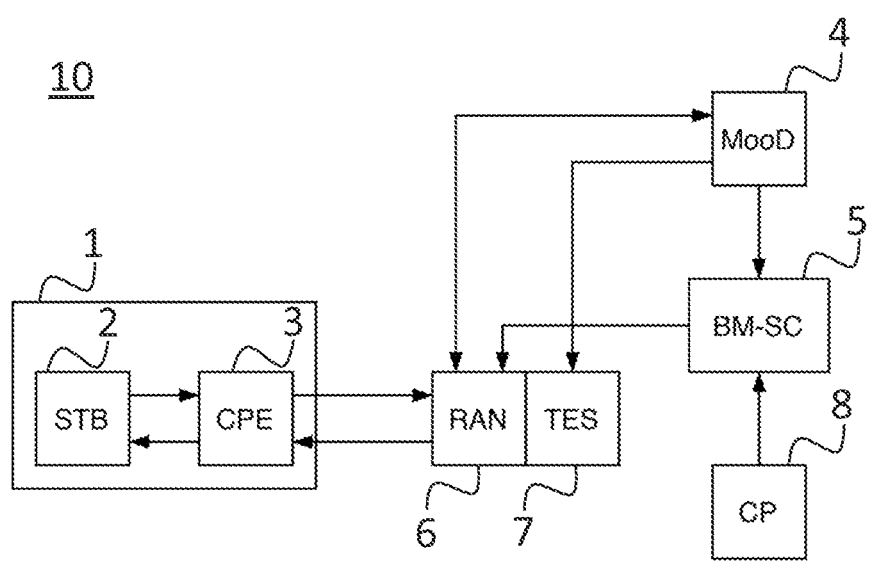
FIG. 3 is a partial schematic diagram of the method according to the embodiment of FIG. 1, relating to the switching from delivery using tunnels to delivery using a multimedia broadcast multicast service.

FIGS. 1, 2 and 3 show an exemplary network system 10 comprising client devices 1 which are wirelessly connected to the Radio Access Network (RAN) devices 6 of a mobile telecommunications network, such as a 3GPP network, and a multimedia server 4, such as a MooD server, which are connected to said network by the internet. In FIG. 1, client device 1 comprises a set top box (STB) 2 and a customer premises equipment (CPE) 3, such as a modem. However, the present invention is not limited thereto. Client device 1 may be, for example, a mobile device capable of performing the combined functions of STB 2 and CPE 3.

When a user of client device 1 wishes to receive multimedia content, a request for content is generated using a multicast address. For example, the request for content is generated by STB 2, and demand for this content may be expressed using Internet Group Management Protocol (IGMP). This request is sent to CPE 3, which initiates a tunnel over network 6. The tunnel may be initiated using any protocol capable of transporting multicast content, such as PPTP or GRE. In network 6, a tunnel endpoint server (TES) 7 is available handling the tunnel protocol.

IGMP is not directly available in network 6. In order to overcome this, the IGMP request is translated into a request suitable for network 6. For example, upon receiving the request for content from STB 2, CPE 3 generates an HTTP request translated from the IGMP request, which comprises at least one of a multicast address a join request, location, such as a cell ID or service area ID) and the client IP address of the initiated tunnel. The HTTP request is then sent by client device 1, e.g. by CPE 3, to multimedia server 4. However, the present invention is not limited to using HTTP requests, and other protocols or a combination thereof may also be used.

Multimedia server 4 performs counting for determining the current demand value of the multimedia content and, based on the determined current demand value and a pre-defined threshold, makes the content available as broadcast using a multimedia broadcast multicast service or individual deliveries using a tunnel. In other words, multimedia server 4 determines the current demand value based on the number of clients which are being provided with the multimedia content and the number of clients from which said request has been received but which are not yet being provided with said multimedia content.

If the current demand value is determined to be below the pre-defined threshold, multimedia server 4 determines the client IP address, Tunnel Endpoint Server (TES) 7 and the initiated tunnel. Then, multimedia server 4 requests TES 7 to join the multimedia content and to deliver said multimedia content as multicast packets to client device 1 over the initiated tunnel. Both operations can be performed using, for example, SMCroute. With the help of SMCroute, the lack of IGMP in network 6 is effectively overcome.

Finally, multimedia server 4 responds back to client device 1 that the multimedia content will be provided using the initiated tunnel. Furthermore, multimedia server 1 may provide additional information, such as the multicast address of the content, as well as a first port number.

As result of the operations by the Tunnel Endpoint, the multicast packets are delivered by a content provider (CP) 8 over the initiated tunnel to CPE 3, which forwards the multimedia content to STB 2. Then, STB 2 can, for example, render the multimedia content on a display device, such as a TV.

If the current demand value is determined to be above the pre-defined threshold, multimedia server 4 provides the multimedia content as multicast packets using a multimedia broadcast multicast service. As the setup for this takes some time for the multimedia content to be available to clients, such as due to starting procedures in a broadcast multicast service center (BM-SC) 5, as well as a delay due to a SYNC protocol, the client which triggered multimedia server 4 to activate broadcast is still initially provided the multimedia content over the initiated tunnel. After a pre-defined period of time, all clients are transferred from being provided content using a tunnel to being provided content using the multimedia broadcast multicast service.

Multimedia server 4 initiates providing the multimedia content using the multimedia broadcast multicast service by requesting BM-SC 5 for delivery of the multimedia content as multicast packets using the multimedia broadcast multicast service.

After BM-SC 5 has been successfully setup and incorporating any delay as result of the SYNC protocol, multimedia server 4 informs, using a switch message, the clients, such as client device 1, that there is a new delivery method. The switch message may comprise an IP/UDP packet created by multimedia server 4, its destination being the multicast address of the multimedia content and the port number being a second port number different from the port number of the multimedia content. For example, the second port number may be one higher than the first port number.

The switch message is delivered as a multicast packet by TES 7 to CPE 3. CPE 3 only has to monitor the presence of traffic at the second port number. When this traffic is present, CPE 3 should generate a second HTTP request, named an HTTP switch request, to multimedia server 4 comprising at least one of a multicast address, a join request, a location and the client IP address of the initiated tunnel.

As the broadcast should now be available on network 6, multimedia server 4 responds to the HTTP switch request that the multimedia content is available over broadcast, including a TMGI, multicast IP address and a first port number. Using the TMGI, CPE 3 can start the multimedia broadcast multicast session. The content can simply be forwarded from CPE 3 towards STB 2 for viewing the multimedia content.

New client devices expressing demand for the multimedia content that is being provided to connected clients using the multimedia broadcast multicast service, are given response by multimedia server 4 that the delivery using the multimedia broadcast multicast service is available.

When the user of client device 1 no longer needs to receive the multimedia content, client device 1 generates a leave request. For example, STB 2 may generate an IGMP leave request. The IGMP leave request is sent to CPE 3, which translates said IGMP leave request into an HTTP leave request, comprising at least one of the multicast address, the current delivery method, namely tunnel delivery or delivery using the multimedia broadcast multicast service, and the client IP address. The HTTP leave request is sent by client device 1 to multimedia server 4, which may acknowledge the request.

If the current delivery method at the time of the HTTP leave request is performed using tunnel delivery, multimedia server 4 halts the delivery of multicast packets to TES 7.

Multimedia server 4 again determines the current demand value as described before, but excluding the number of clients from which a leave request has been received.

In case the delivery is performed using the multimedia broadcast multicast service and the current demand value remains above the pre-defined threshold, nothing needs to be done, except update the current demand value.

In case the delivery is performed using the multimedia broadcast multicast service and the current demand value is determined to be below the pre-defined threshold, multimedia server 4 initiates a switching procedure from providing content via the multimedia broadcast multicast service to providing content via tunnels. For example, multimedia server 4 creates an IP/UDP switch message, with its destination being the multicast address of the multimedia content and the port number being the second port number. The message is delivered using the multimedia broadcast multicast service to client device 1 and other connected client devices. In turn, the client devices send another HTTP switch request for the multimedia content. multimedia server 4 then responds back to perform delivery of the multimedia content using the tunnel and set up the necessary at TES 7.

Once all client devices have switched to delivery using corresponding tunnels, the multimedia broadcast multicast service is stopped by multimedia server 4.

Since the multimedia broadcast multicast service requires a SYNC protocol, e.g. the 3GPP SYNC protocol in a 3GPP network, the data packets are timed for transmission in the very near feature, i.e. after a pre-defined delay time. The delay may be added in order to ensure that the multimedia broadcast multicast service transmission can be done from multiple nodes simultaneously. Depending on the configuration, the data packets may be delayed for 80-160 ms earliest before they are transmitted. In order to prevent disruption in the multimedia content at client device 1 when switching from one delivery method to the other, the delivery using tunnels is intentionally delayed with a delay substantially equal to the pre-defined delay time of the delivery using the multimedia broadcast multicast service. For example, the delay can be conveniently applied when the tunnel for a new client device requesting the multimedia content is initiated and applied to solely the multicast channels using for example linux traffic control.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A method for providing multimedia content in a mobile telecommunications network, the method comprising:
   creating a request for a multimedia content from said mobile telecommunications network by each one of a multitude of clients in said mobile telecommunications network;
   sending, by each one of said multitude of clients, said request to a multimedia server connected to said mobile telecommunications network;
   determining, by said multimedia server, a current demand value for said multimedia content, said current demand value being the number of clients provided with said multimedia content and the number of clients from which said request has been received but not yet being provided with said multimedia content; and
   in response to the determined current demand value of said multimedia content is equal to or above a pre-defined threshold, providing said multitude of clients with said multimedia content as multicast packets using a multimedia broadcast multicast service, and
   in response to the determined current demand value of said multimedia content is below said pre-defined threshold, providing said multitude of clients with said multimedia content using a tunnel, the tunnel is set up to each one of said clients using a tunnel protocol, wherein said multimedia content is sent as multicast packets, the multicast packets are encapsulated by using said tunnel protocol,
   wherein the method further comprises, in response to at least one client requesting the multimedia content results in the current demand value for said multimedia content to increase from below the pre-defined threshold to above said pre-defined threshold:
   requesting, by said multimedia server, a broadcast multicast service center in said mobile telecommunications network to provide said multimedia content over said multimedia broadcast multicast service;
   sending, by said multimedia server, after a pre-defined period of time, a switch message to each one of said multitude of clients being provided with said multimedia content using the tunnels corresponding to said clients;
   sending, by each one of said multitude of clients, after receiving said switch message, a new request for multimedia content from said mobile telecommunications network to said multimedia server;
   responding, by said multimedia server, to each one of said multitude of clients that said multimedia content is available over said multimedia broadcast multicast service;
   providing, by said broadcast multicast service center, said clients with said multimedia content using said multimedia broadcast multicast service; and
   halting, by said multimedia server, the multimedia content delivery over the corresponding tunnels,
   wherein the new request for multimedia content further comprises a flag which indicates that the request is sent in response to a switch request.

2. The method according to claim 1, wherein said request for multimedia content from each one of said multitude of clients comprises a request to initiate said tunnel over said mobile telecommunications network to said client.

3. The method according to claim 1, wherein the tunnel protocol is handled by tunnel endpoint servers in said mobile telecommunications network.

4. The method according to claim 3, wherein the tunnel endpoint servers in said mobile telecommunications network are part of radio access network (RAN) devices in said mobile telecommunications network.

5. The method according to claim 1, wherein responding, by said multimedia server, to each one of said multitude of clients that said multimedia content is available over said multimedia broadcast multicast service further comprises sending a multicast internet protocol (IP) address, a first port number and a temporary mobile group identity (TMGI).

6. The method according to claim 1, wherein the clients use the temporary mobile group identity to start said multimedia broadcast multicast service session.

7. The method according to claim 1, wherein sending, by the multimedia server, the switch message to each one of said multitude of clients being provided with said multimedia content comprises sending one or more IP/UDP packets having as port a second port number different from the first port number.

8. The method according to claim 1, wherein providing the multimedia content as encapsulated multicast packets to each one of said multitude of clients using the corresponding tunnels is delayed by a pre-defined delay time, said pre-defined time corresponding to a delay that on average is caused by syncing schedules of the multimedia broadcast multicast service that is used, which pre-defined delay time is between 80 ms and 160 ms.

9. The method according to claim 8, wherein the pre-defined delay time is between 80 ms and 160 ms.

10. The method according to claim 1, wherein creating, by at least one client, a request for multimedia content from the mobile telecommunications network comprises:
   using a multicast address and an internet group management protocol (IGMP), for generating an IGMP join request; and
   translating said IGMP join request into a hypertext transfer protocol (HTTP) join request,
   wherein said HTTP join request comprises at least one of a multicast address, a join request, a location and a client IP address of the corresponding initiated tunnel.

11. The method according to claim 1, wherein providing the multimedia content as encapsulated multicast packets to the each one of said multitude of clients via the corresponding tunnel comprises requesting, by the multimedia server, the tunnel endpoint server to join the multimedia content and to deliver said multimedia content as encapsulated multicast packets over the corresponding initiated tunnel using a static multicast routing daemon (SMCroute).

12. The method according to claim 11, wherein the tunnel endpoint server joins the multimedia content and to delivers the multimedia content as encapsulated multicast packets over the corresponding initiated tunnel using a static multicast routing daemon (SMCroute).

13. The method according to claim 1, wherein the method further comprises, when at least one client receiving the multimedia content no longer needs to receive the multimedia content:
   creating, by said at least one client, a request to stop receiving said multimedia content;
   sending, by said at least one client, said request to the multimedia server;
   sending, by said multimedia server, an acknowledge message to said at least one client; and
   stop providing, by said multimedia server, said multimedia content to said at least one client.

14. The method according to claim 13, wherein the method further comprises:
   determining, by the multimedia server, the current demand value for the multimedia content, said current demand value being the number of clients provided with said multimedia content and the number of clients from which a join request has been received but not yet being provided with said multimedia content, and excluding the number of clients from which a leave request has been received, and when at least one client requesting to stop receiving said multimedia content results in the current demand value for said multimedia content to decrease from equal to or above the pre-defined threshold to below said pre-defined threshold:
   sending, by said multimedia server, a switch message to each one of said multitude of clients being provided with said multimedia content using the multimedia broadcast multicast service;
   sending, by each one of said multitude of clients, after receiving said switch message, a new request for multimedia content from said mobile telecommunications network to said multimedia server;
   setting up, by the multimedia server, a tunnel to each one of said clients using a tunnel protocol;
   responding, by said multimedia server, to each one of said multitude of clients that the delivery of said multimedia content will be performed using a tunnel corresponding to each one of said multitude of clients;
   providing said multitude of clients with said multimedia content using corresponding tunnels; and
   after each of said multitude of clients have switched to tunnel delivery, stop providing said multimedia content using the multimedia broadcast multicast service.

15. The method according to claim 13, wherein creating, by at least one client, a request to stop receiving multimedia content from the mobile telecommunications network comprises:
   using a multicast address and IGMP, for generating an IGMP leave request; and
   translating said IGMP leave request into an HTTP leave request,
   wherein said HTTP leave request comprises at least one of a multicast address, a current delivery method, a leave request, and a client IP address.

16. The method according to claim 1, wherein the tunnel protocol comprises a point-to-point tunnel (PPTP) or a generic routing encapsulation (GRE) protocol.

17. The method according to claim 1, wherein the multimedia server comprises an MBMS operation on demand (MooD) server.

* * * * *